United States Patent
Byun

(10) Patent No.: US 7,350,218 B2
(45) Date of Patent: Mar. 25, 2008

(54) OPTICAL-DISK DRIVE AND OPTICAL-DISK EJECTION CONTROL METHOD

(75) Inventor: Young-ki Byun, Yongin-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 681 days.

(21) Appl. No.: 10/967,191

(22) Filed: Oct. 19, 2004

(65) Prior Publication Data

US 2005/0144626 A1 Jun. 30, 2005

(30) Foreign Application Priority Data

Dec. 26, 2003 (KR) ...................... 10-2003-0097543

(51) Int. Cl.
  G11B 17/03 (2006.01)
  G11B 17/04 (2006.01)
  G11B 33/02 (2006.01)
(52) U.S. Cl. ................ 720/608; 369/30.29; 369/30.85; 369/30.96
(58) Field of Classification Search ................ 720/608; 369/30.29, 30.85, 30.96
See application file for complete search history.

(56) References Cited

U.S. PATENT DOCUMENTS

| | | | | |
|---|---|---|---|---|
| 4,995,027 A * | 2/1991 | Aoyagi et al. | ............... | 720/626 |
| 5,631,882 A * | 5/1997 | Mascenik | ................ | 369/30.32 |
| 5,737,285 A * | 4/1998 | Uchiyama | ................ | 369/30.32 |
| 5,815,470 A * | 9/1998 | Ohmori et al. | ............. | 369/13.2 |
| 6,005,833 A * | 12/1999 | Yasuma et al. | ............. | 720/602 |
| 6,169,711 B1 * | 1/2001 | Koh | ........................ | 369/30.36 |
| 6,324,154 B1 * | 11/2001 | Kakuta et al. | ............. | 369/264 |
| 6,496,463 B1 * | 12/2002 | Ogawa et al. | ............. | 720/606 |
| 6,560,510 B1 * | 5/2003 | Costas | ........................ | 700/218 |
| 6,603,723 B2 * | 8/2003 | Minase | ...................... | 720/673 |
| 6,661,763 B2 * | 12/2003 | Kurashina et al. | ........ | 369/59.25 |
| 6,785,898 B1 * | 8/2004 | Nakamichi | .................... | 720/621 |
| 6,892,385 B2 * | 5/2005 | Kimikawa et al. | ......... | 720/631 |
| 6,981,269 B2 * | 12/2005 | Minase | ...................... | 720/602 |
| 7,086,729 B2 * | 8/2006 | Yoshikaie | .................... | 347/104 |
| 7,219,355 B2 * | 5/2007 | Kudara et al. | ............. | 720/626 |

FOREIGN PATENT DOCUMENTS

| | | |
|---|---|---|
| KR | 1998-85123 | 5/1997 |
| KR | 1999-001679 | 1/1999 |
| KR | 2001-38286 | 5/2001 |
| KR | 2001-55848 | 7/2001 |

OTHER PUBLICATIONS

Korean Office Action dated Sep. 23, 2005.

* cited by examiner

*Primary Examiner*—Angel Castro
*Assistant Examiner*—Christopher R. Magee
(74) *Attorney, Agent, or Firm*—Roylance, Abrams, Berdo & Goodman, LLP

(57) ABSTRACT

An optical disk drive comprises a drive body, a spindle motor, an optical pickup device, a sled motor, a tray, a loading motor, and a controller. When the loaded optical disk is ejected, the controller controls the sled motor and the loading motor so that the returning of the optical pickup device and the opening of the tray are performed in non-chronological order. Accordingly, the time for the ejection of the optical disk is reduced.

8 Claims, 7 Drawing Sheets

OPTICAL-DISK DRIVE AND OPTICAL-DISK EJECTION CONTROL METHOD

CROSS-REFERENCE TO RELATED APPLICATIONS

This application claims the benefit under 35 U.S.C. § 119(a) of Korean Patent Application No. 2003-97543, filed on Dec. 26, 2003, in the Korean Intellectual Property Office, the entire disclosure of which is incorporated herein by reference.

BACKGROUND OF THE INVENTION

1. Field of the Invention

The present invention relates to an optical-disk drive. More particularly, the present invention relates to an optical-disk drive and an optical-disk ejection control method which enables the ejection of an optical-disk without delay.

2. Description of the Related Art

Generally, optical-disk drives (ODD) record data on an optical-disk such as a CD and a DVD and reproduce the recorded data. Widely used optical disk drives are a CD-R, a CD-RW, a DVD-R, a DVD-RW and so on, and a Blue-Ray disk (BD) drive is being newly developed for use of a BD, which has a greater data storage capacity than the CD or the DVD.

The optical-disk drive typically comprises a drive body having an optical pickup device and a spindle motor mounted therein, and a tray slidably disposed in the drive body to load an optical disk.

When the tray is inserted into the drive body and the optical disk is loaded, the optical disk is rotated by the spindle motor. The optical pickup device scans laser beams onto the loaded optical disk, thereby recording data onto the optical disk or optically picking up the data from the optical disk. The data is recorded along a helical track formed on the recording surface of the optical disk. The track is formed from an inner circumference to an outer circumference of the optical disk, and the data is recorded from the inner to the outer circumference. The optical pickup device reads or writes data while moving from the inner to the outer circumference of the optical disk.

The tray is moved in or out of the drive body by a loading motor. The optical pickup device is moved by a sled driving device. The sled driving device is driven by a sled motor disposed in the drive body, and transforms the rotational movement of the sled motor into a linear movement of the optical pickup device.

The conventional optical disk drive with the above construction takes the steps as shown in FIG. 1 to eject the loaded optical disk. Firstly, the spindle motor for rotating the optical disk is stopped (step of S10). A sled home-in operation starts so that the optical pickup device moves to an initial position of the inner circumference side of the optical disk, where the data starts to be recorded on the optical disk (step of S20). Subsequently, it is determined whether the sled home-in operation is completed or not (step of S30), and if the sled home-in operation is completed, the loading motor is driven and the tray is opened (step of S40).

In the conventional optical disk drive, the returning of the optical pickup device to the initial position and the opening of the tray are processed in sequence sometimes delaying the ejection of the optical disk.

SUMMARY OF THE INVENTION

The present invention has been developed in order to solve the above problems in the related art and provide additional advantages. Accordingly, an aspect of the present invention is to provide an optical disk drive and an optical disk ejection control method. The optical disk drive is capable of ejecting an optical disk without delay by performing a sled home-in operation of returning the optical pickup device to its initial position and opening the tray in non-chronological order.

The above aspect is achieved by providing an optical disk drive comprising a drive body, a spindle motor, an optical pickup device, a sled motor, a tray, a loading motor, and a controller. When the loaded optical disk is ejected, the returning of the optical pickup device and the opening of the tray are performed non-chronologically.

The controller controls the sled motor and the loading motor so that the movement of the optical pickup device precedes the opening of the tray, or the opening of the tray precedes the movement of the optical pickup device.

Also, the controller controls the sled motor and the loading motor so that the movement of the optical pickup device and the opening of the tray are performed at the same time.

According to an embodiment of the optical disk ejection control method, after stopping the spindle motor, the return of the optical pickup device and opening of the tray are performed in non-chronological order.

The returning of the optical pickup device may precede the opening of the tray. The opening of the tray may precede the returning of the optical pickup device.

Also, the returning of the optical pickup device and the opening of the tray may be performed at the same time.

BRIEF DESCRIPTION OF THE DRAWING FIGURES

The above aspect and other advantages of the present invention will be more apparent by describing an embodiment of the present invention with reference to the accompanying drawing figures, in which.

In the drawing figures, it will be understood that like reference numerals refer to like features and structures.

DETAILED DESCRIPTION OF THE EXEMPLARY EMBODIMENTS

Hereinafter, an optical disk drive according to an embodiment of the present invention will now be described in detail with reference to the accompanying drawings.

The matters defined in the description such as a detailed construction and elements are provided to assist in a comprehensive understanding of the invention. Thus, for sake of clarity, detailed descriptions of well-known functions and constructions are omitted.

Figure 1:
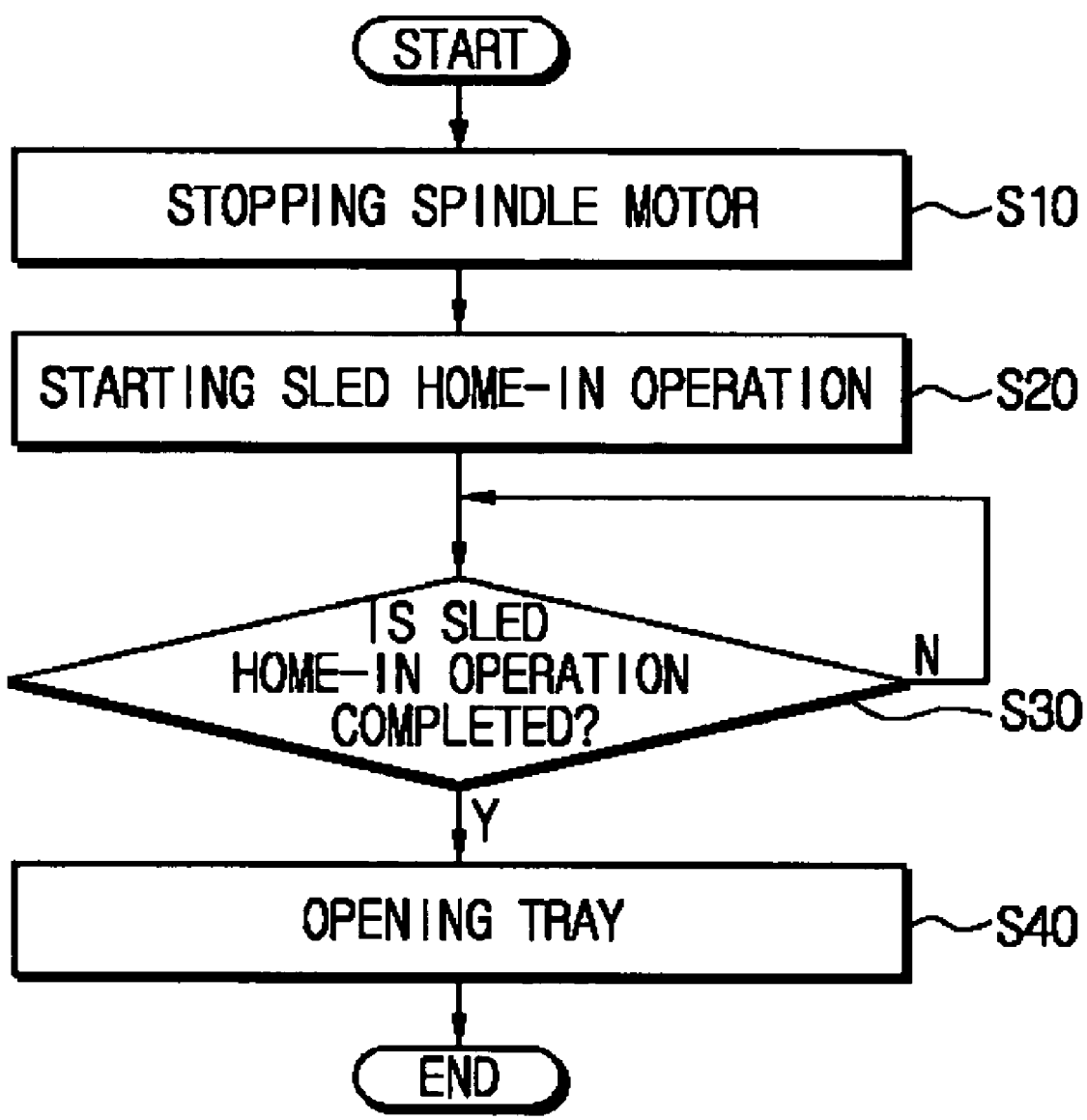
FIG. 1 is a flowchart showing steps of a conventional optical disk ejection control method.
Figure 2:
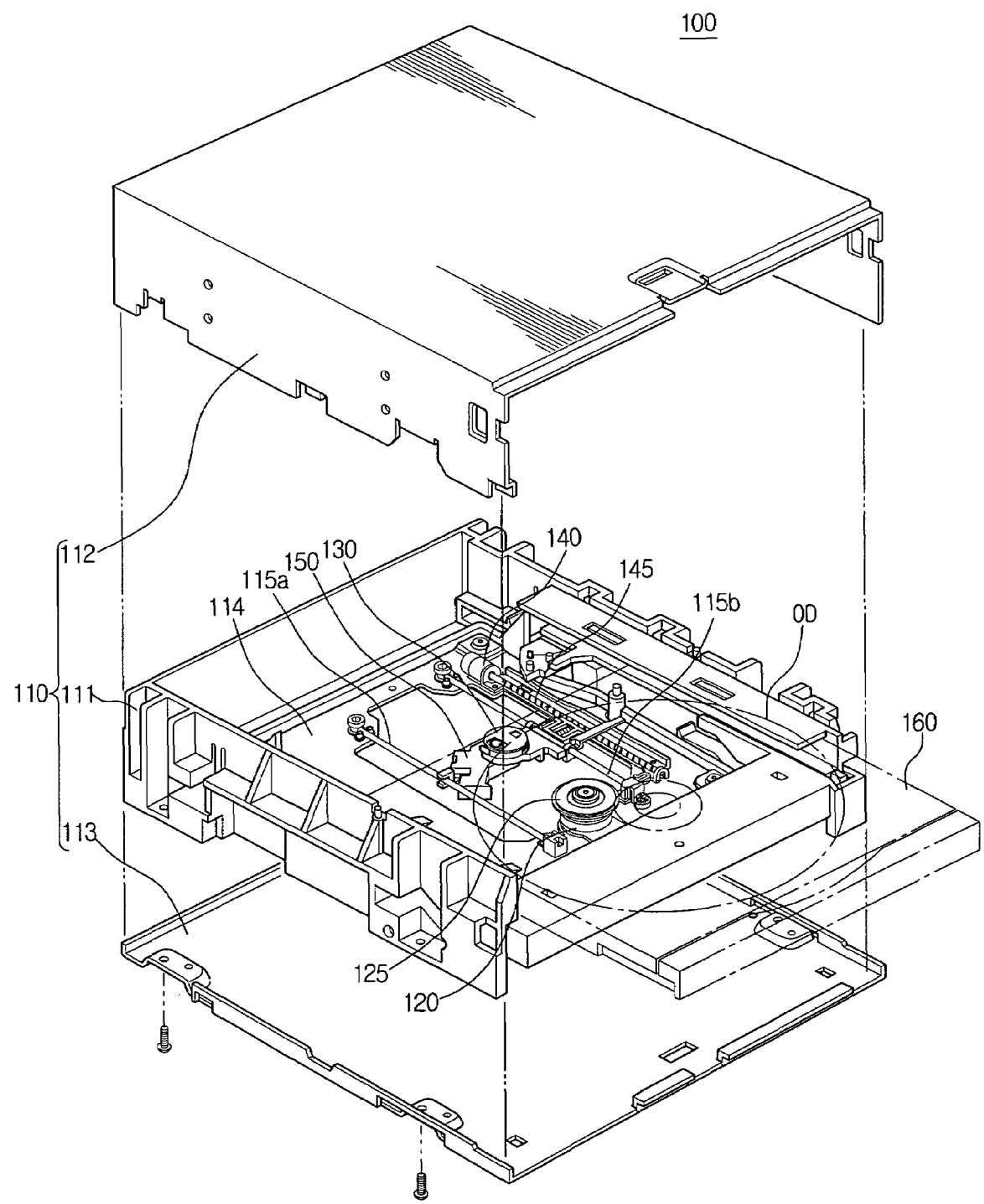
FIGS. 2 and 3 are an exploded perspective view and a block diagram showing an optical disk drive according to an embodiment of the present invention.
Figure 3:
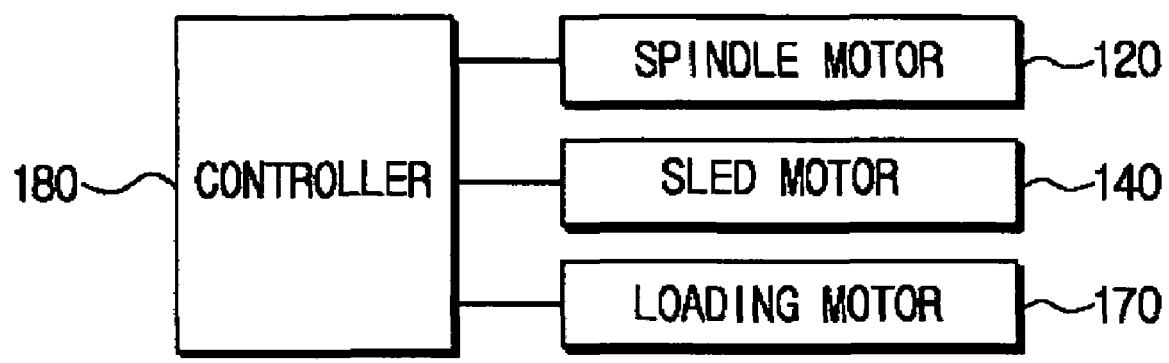

Referring to FIGS. 2 and 3, an optical disk drive 100 according to an embodiment of the present invention comprises a drive body 110, a spindle motor 120, an optical pickup device 130, a sled motor 140, a tray 160, a loading motor 170 (see FIG. 4) and a controller 180.

The drive body 110 forms the exterior of the optical disk drive 100 and comprises a frame 111, an upper cover 112 and a lower cover 113 as shown in FIG. 2. A deck base 114 and an ascending and descending device 190 (see FIG. 4) for ascending and descending the deck base 114 are disposed inside the frame 111. The spindle motor 120, the optical pickup device 130 and the sled motor 140 are preferably disposed on the deck base 114. One end of the deck base 114, where the spindle motor 140 is disposed, ascends and descends vertically. The upper and the lower covers 112 and 113 cover the upper and lower portions of the frame 111, respectively.

The spindle motor 120 engages with a turntable 125 on which an optical disk OD is seated. When the spindle motor 120 is driven, the optical disk OD seated on the turntable 125 is rotated at a high speed.

The optical pickup device 130 scans laser beams onto the loaded optical disk OD, thereby reading out data from the optical disk OD or writing data onto the optical disk OD. The optical disk device 130 is disposed on a sled driving device 150 and reciprocates in a radial direction of the optical disk OD in relation to the movement of the sled driving device 150. The sled driving device 150 is preferably supported by a pair of guide bars 115a and 115b disposed on the deck base 114, and moves in relation to the movement of a screw shaft 145 connected to the sled motor 140. That is, the sled driving device 150 has one end contacting an outer circumference of the screw shaft 145 so that the sled driving device 150 is brought into linear movement along the screw shaft 145 when the screw shaft 145 rotates.

In this embodiment, the sled motor 140, the screw shaft 145 and the sled driving device 150 serve as a means for moving the optical pickup device 130. However, the means for moving the optical pickup device 130 may adopt different structures. Although not shown, the means for moving the optical pickup device 130 may be realized by a sled driving device where a pinion gear connected to a sled motor and a rack moving in relation to the movement of the pinion gear are mounted together.

Figure 4:
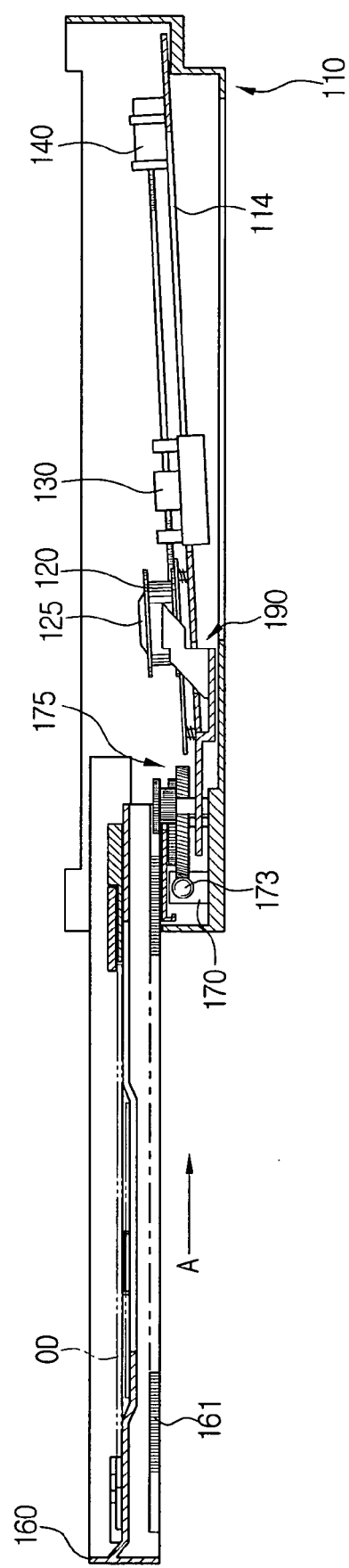
FIGS. 4 through 6 are side section views showing the operation of the optical disk drive according to an embodiment of the present invention.

The tray 160 advances to and retreats from the drive body 110 to load and unload the optical disk OD. As shown in FIG. 4, a rack 161 is disposed at one side of the lower portion of the tray 160. The rack 161 is connected to the loading motor 170 disposed inside the drive body 110 through a worm shaft 173 and a loading gear train 175. The driving of the loading motor 170 rotates the worm shaft 173, and consequently, the loading gear train 175 engaging with the worm shaft 173 moves the rack 161. Accordingly, the tray 160 linearly moves in or out of the drive body 110 according to the rotation direction of the loading motor 170. The linear movement of the tray 160 may be realized by other adequate structures.

The controller 180 controls the overall operations of the optical disk drive 100. More specifically, the controller 180 controls the rotation direction of the loading motor 170 related to the advancing and retreating of the tray 160. Also, the controller 180 controls the spindle motor 120 to rotate the optical disk OD at a high speed. In addition, the controller 180 controls the sled motor 140 to move the optical pickup device 130 in the radial direction of the optical disk OD, so that the optical pickup device 130 smoothly writes data onto the optical disk OD or reads data from the optical disk OD.

Hereinafter, operations of the optical disk drive and an optical disk ejection control method according to an embodiment of the present invention will be described with reference to the accompanying drawing figures.

When the tray 160 is completely extended from the drive body 110 as shown in FIG. 4, the tray 160 stands ready to receive the optical disk OD thereon. When the tray 160 is opened, the optical pickup device 130 is in a sled home-in state in which the optical pickup device 130 is located adjacent to the spindle motor 120. The deck base 114 has one end, where the spindle motor 120 is mounted, descended in order for the turntable 125 not to interfere with the inserting of the optical disk OD or tray 160. When the optical disk OD is seated on the tray 160 and a tray insert signal is generated, the controller 180 (see FIG. 3) drives the loading motor 170. In relation to the movements of the worm shaft 173, the loading gear train 175 and the rack 161, the tray 160 moves in an inserting direction A.

Figure 5:
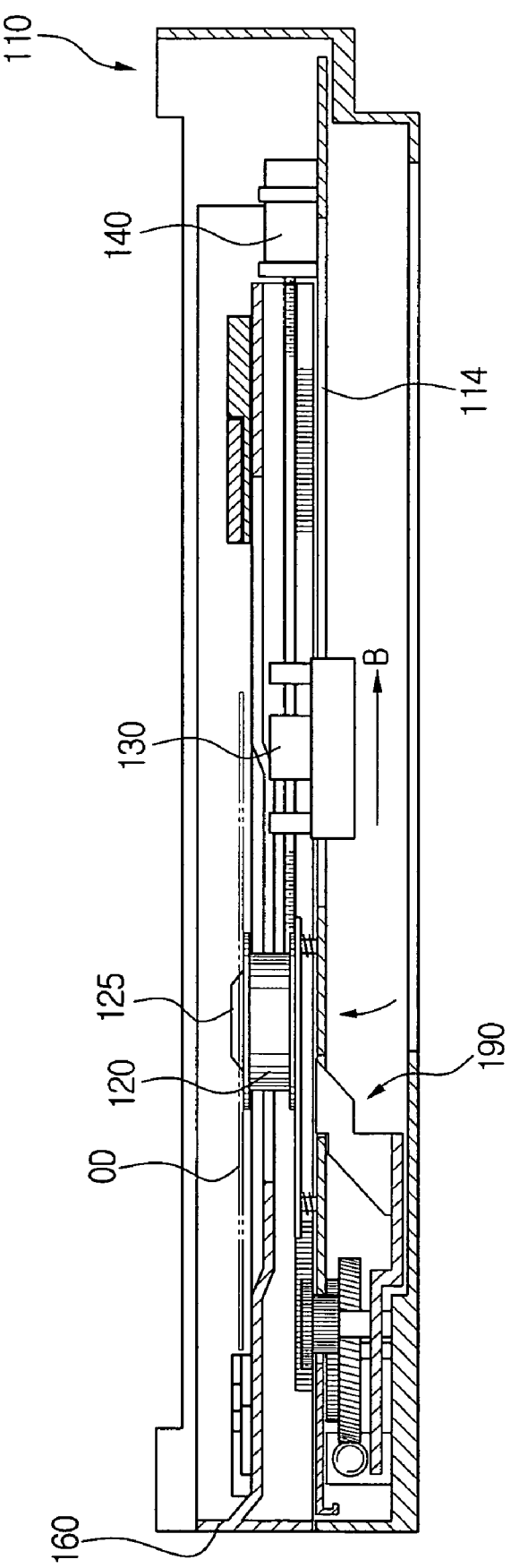

When the tray 160 is snugly inserted in the drive body 110, a center portion of the optical disk OD is placed on the turntable 125 as shown in FIG. 5. Also, a damper (not shown) disposed between the frame 111 and the upper cover 112 (see FIG. 2) presses the center portion of the optical disk OD so that the optical disk OD is brought into close contact with the turntable 125. When the loading of the optical disk OD is completed as above, the controller 180 (see FIG. 3) drives the spindle motor 120 to rotate the optical disk OD at a high speed. Also, the controller 180 controls the rotation direction and RPM of the sled motor 140 to move the optical pickup device 130 in a direction B from the inner circumference to the outer circumference of the optical disk OD. At this time, the optical pickup device 130 scans laser beams onto the optical disk OD, thereby writing and reading data on the optical disk.

Figure 6:
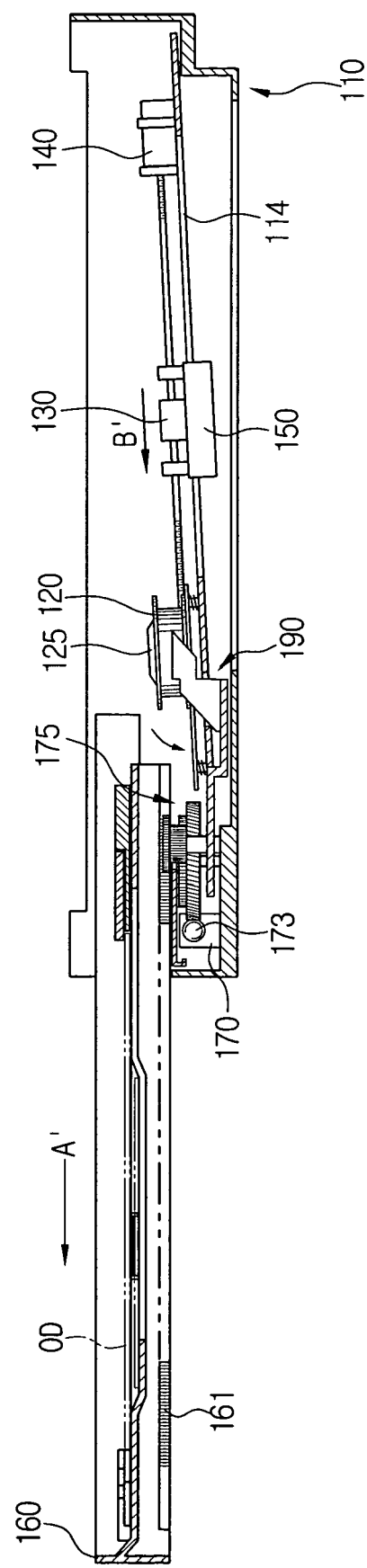
Figure 7:
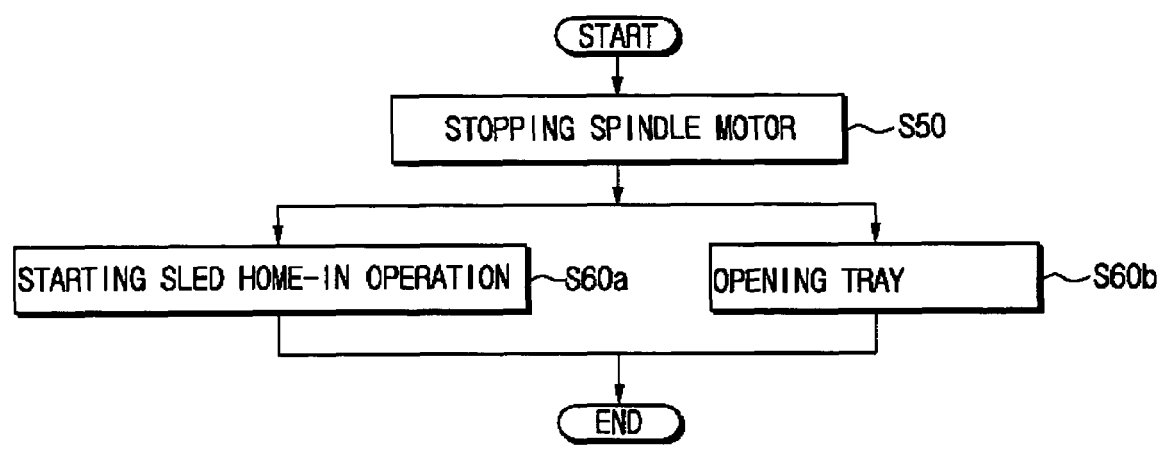
FIG. 7 is a flowchart showing the steps of an optical disk ejection control method according to an embodiment of the present invention.

Meanwhile, the ejection of the optical disk OD is processed through several steps as shown in FIG. 7 with reference to the elements shown in FIG. 6.

When an ejection signal of the optical disk is generated, the controller 180 (see FIG. 3) stops the spindle motor 120 (step of S50). Next, the controller 180 drives the sled motor 140 and the loading motor 170 to perform the sled home-in operation of the optical pickup device 130 and the opening of the tray 160 in non-chronological order. That is, the controller 180 preferably controls the sled motor 140 and the loading motor 170 in a manner so that the sled home-in operation of the optical pickup device 130 and the opening of the tray 160 at least partially overlap with each other.

At this time, the tray 160 can be opened (step of S60b) before the movement of the optical pickup device 130 in the direction B' (See FIG. 6) to the inner circumference of the optical disk OD is finished by the sled home-in operation of the controller 180 (step of S60a). Contrarily, the controller 180 can control the optical pickup device 130 to perform the sled home-in operation (step of S60a) before the movement of the tray 160 to the ejection direction A', which is accomplished by the opening of the tray 160 (step of S60b), is finished. Also, the controller 180 controls the sled motor 140 and the loading motor 170 so that the movement of the optical pickup device 130 and the opening of the tray 160 can be performed simultaneously.

Since the sled home-in operation and the opening of the tray 160 occur at the same time, the tray 160 can be opened immediately, upon generation of the ejection signal of the optical disk OD.

In light of the foregoing, when the optical disk OD is ejected, the sled home-in operation of returning the optical pickup device 130 to the initial position, and the opening of the tray 160, are performed at the same time. Accordingly, compared to the related art in which the optical disk is not opened until the sled home-in operation is finished, the present invention reduces the time for ejection of the optical disk.

The foregoing embodiment and advantages are merely exemplary and are not to be construed as limiting the present invention. The description of the embodiments of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An optical disk drive comprising:
    a drive body on which an optical pickup device is movably disposed;
    a sled motor to move said optical pickup device;
    a tray moving in and out of said drive body to load and unload an optical disk;
    a loading motor to advance and retreat said tray;
    a spindle motor to rotate said loaded optical disk; and
    a controller controlling the operations of said sled motor, said loading motor, and said spindle motor,
    wherein the controller controls said sled motor and said loading motor so that the movement of said optical pickup device and the opening of said tray are performed in non-chronological order when ejecting the loaded optical disk.

2. The optical disk drive as claimed in claim 1, wherein said controller controls said sled motor and said loading motor so that the movement of said optical pickup device precedes the opening of said tray.

3. The optical disk drive as claimed in claim 1, wherein the controller controls said loading motor and said sled motor so that the opening of the tray precedes the movement of said optical pickup device.

4. The optical disk drive as claimed in claim 1, wherein said controller controls said sled motor and said loading motor so that the movement of the optical pickup device and the opening of the tray are performed at the same time.

5. An optical disk ejection control method, comprising the steps of:
    stopping a spindle motor from rotating a loaded optical disk;
    returning an optical pickup device that scans laser beams on said loaded optical disk to an initial position; and
    opening a tray where the optical disk is seated,
    wherein said returning of said optical pickup device and said opening of said tray are performed in non-chronological order.

6. The optical disk ejection control method as claimed in claim 5, wherein said returning of the optical pickup device precedes the opening of the tray.

7. The optical disk ejection control method as claimed in claim 5, wherein said opening of said tray precedes said returning of said optical pickup device.

8. The optical disk ejection control method as claimed in claim 5, wherein said returning of said optical pickup device and said opening of said tray are performed at the same time.

* * * * *